US009648591B2

(12) United States Patent
Rastogi (10) Patent No.: US 9,648,591 B2
(45) Date of Patent: May 9, 2017

(54) AVOIDING RADIO ACCESS NETWORK CONGESTION

(71) Applicant: Amazon Technologies, Inc., Reno, NV (US)

(72) Inventor: Nupur Rastogi, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/458,043

(22) Filed: Aug. 12, 2014

(65) Prior Publication Data
US 2016/0050653 A1 Feb. 18, 2016

(51) Int. Cl.
| | | |
|---|---|---|
| H04W 72/04 | (2009.01) | |
| H04W 72/10 | (2009.01) | |
| H04W 24/08 | (2009.01) | |
| H04W 28/02 | (2009.01) | |
| H04L 12/835 | (2013.01) | |

(52) U.S. Cl.
CPC ......... *H04W 72/0406* (2013.01); *H04L 47/30* (2013.01); *H04W 24/08* (2013.01); *H04W 28/0205* (2013.01); *H04W 72/0486* (2013.01); *H04W 72/10* (2013.01)

(58) Field of Classification Search
USPC ....................................................... 455/453
See application file for complete search history.

(56) References Cited

U.S. PATENT DOCUMENTS

| | | | |
|---|---|---|---|
| 2011/0039562 A1* | 2/2011 | Balasubramanian et al. .............................. | 455/436 |
| 2013/0084869 A1* | 4/2013 | Johansson et al. ........... | 455/436 |
| 2013/0272251 A1* | 10/2013 | Schmidt ................ | H04W 72/12 370/329 |
| 2014/0086052 A1 | 3/2014 | Cai et al. | |
| 2016/0050585 A1* | 2/2016 | Shan .................... | H04B 7/0456 370/235 |

FOREIGN PATENT DOCUMENTS

| | | |
|---|---|---|
| EP | 2731375 | 5/2014 |
| WO | 2013034663 | 3/2013 |

OTHER PUBLICATIONS

Maeder, "Towards User-Plane Congestion Management in LTE EPS", retrieved on Aug. 14, 2017 at <<http://www.ikr.uni-stuttgart.de/Content/itg/fg524/Meetings/2012-03-13-Muenchen/02_ITG524_Munich_Maeder.pdf>>, NEC Corporation, Mar. 2012, 15 pages.
Sasada, et al. "Core Network Infrastructure and Congestion Control Technology for M2M Communications", NTT DOCOMO Technical Journal, vol. 15., No. 2, 2013 pp. 31-36.
The PCT Search Report and Written Opinion mailed Oct. 8, 2015 for PCT application No. PCT/US2015/042677, 9 pages.

* cited by examiner

*Primary Examiner* — Kabir A Timory
(74) *Attorney, Agent, or Firm* — Lee & Hayes, PLLC (57) ABSTRACT

In an LTE (Long Term Evolution) system, a radio access network (RAN) is configured to detect and report congestion radio congestion to a core network. RAN congestion may be indicated by lost, discarded, or retransmitted data packets. In response to being notified of congestion at the RAN, the core network of the system modifies properties of data bearers and data flows between the core network and the RAN, such as by modifying QoS commitments where possible and remapping data flows.

20 Claims, 4 Drawing Sheets

AVOIDING RADIO ACCESS NETWORK CONGESTION

BACKGROUND

Increases in cellular traffic from devices like smartphones and tablet computers have led to increased network congestion at both the base station and the core network. Much of this traffic is due to bandwidth hungry applications like video conferencing, data streaming etc.

Network congestion leads to packet drops and degradations of user experience. Although modern network standards such as LTE (Long Term Evolution) provide mechanisms for fast error correction at the Radio Access Network (RAN), these mechanisms are often wasteful of backhaul bandwidths.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are systems, components, techniques, and methods for avoiding or reducing user plane congestion at the radio access network (RAN) of a cellular communication system.

The RAN, which includes a base station and multiple mobile devices or UEs, is configured to allocate its resources to support the quality-of-service (QoS) requirements of multiple data bearers belonging to different UEs. A data bearer is a logical communications channel, containing one or multiple individual service data flows having the same QoS requirements.

The RAN may purposely over allocate its resources, relying on the likely fact that many of the data bearers will be underutilized at any given time. However, this practice may cause a shortage of resources during times of heavy usage by a majority of users.

The RAN is configured to monitor RAN congestion as indicated by a quantities of data packets that are discarded, lost, or retransmitted by protocol stack layers of the base station and mobile devices of the RAN, where each quantity may be specified by an absolute number or a percentage or ratio of packet loss. When congestion is detected based on such data, the RAN notifies the core network of the detected congestion and provides metrics regarding the severity of the congestion. The core network responds by changing the communication parameters of data bearers and/or service data flows between the core network and the RAN. Communication parameters may include (QoS) parameters, mappings of service data flows to traffic flow templates, data bearer properties, relative priorities of data flows and packets, socket port numbers used for data flows and data bearers, which of multiple available base stations are used for data flows/bearers with specific devices, and so forth. The core network may monitor and receive congestion metrics from multiple RANs and may change the communication parameters or individual RAN configurations of one or more RANs so as to improve overall performance of the cellular network.

In response to congestion at the RAN, for example, the core network may lower QoS commitments of certain data bearers (e.g., the guaranteed bit rate (GBR) for a GBR bearer or the UE aggregate maximum bit rate (UE-AMBR) for non GBR bearers of a UE) or may release certain data bearers after notifying their endpoints. As another example, the core network may remap individual service data flows belonging to a data bearer to different traffic flow templates or change the socket port numbers used by data bearers. As yet another example, the core network may trigger a load balancing handover for a UE to a different base station to alleviate congestion at the original base station.

The described techniques allow the core network to combine the congestion information received from multiple RANs with the already available information at the core network to make better traffic and resource decisions based on the enhanced knowledge.

Figure 1:
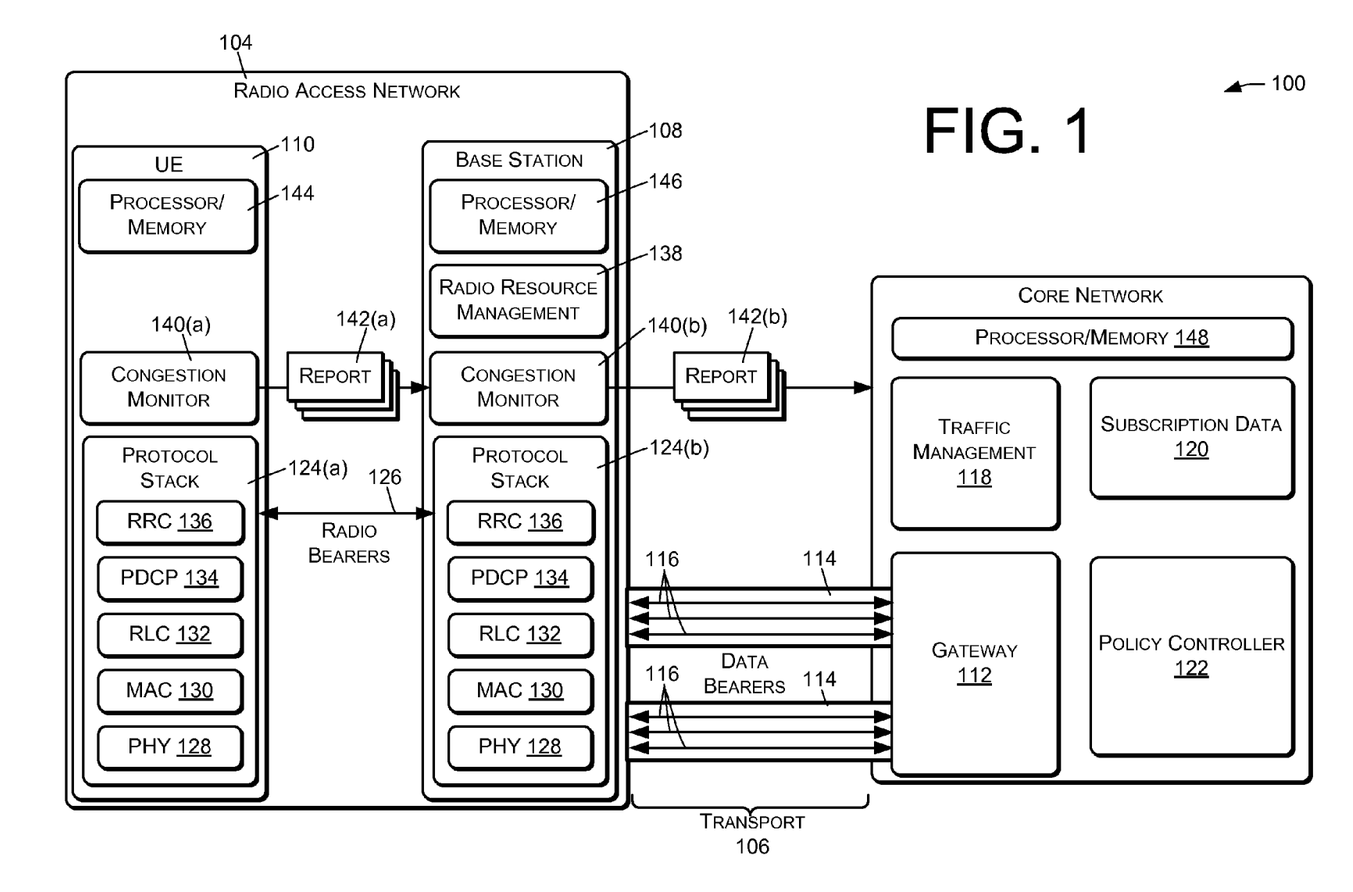
FIG. 1 is a block diagram of an example cellular communications system that is responsive to congestion feedback from a radio access network of a cellular communications system to select traffic policies at the core network of the cellular communications system.

FIG. 1 shows an example of a mobile device communication network 100 in which the described techniques may be implemented. The network 100 comprises a core network (CN) 102 and a radio access network (RAN) 104 that communicate with each other over a transport or backhaul communication channel 106. The communication network 100 may comprise a GSM (Global System for Mobile Communications) cellular network, a UMTS (Universal Mobile Telecommunications Systems) cellular network, a CDMA (code division multiple access) cellular network, or another type of wireless communications network for mobile devices.

In some embodiments, the network 100 may implement LTE (Long-Term Evolution) technologies for voice and data communications. The RAN 104 may be an LTE RAN implemented in part by a base station or base transceiver station (BTS) 108. The base station 108 may comprise a Node B or evolved Node B (eNodeB) base station, as defined by the LTE specification.

The RAN 104 may include multiple mobile handsets or other mobile data devices 110, which are referred to in this environment as user equipment (UE). The mobile devices 110 communicate through the base station 108 and the transport channel 106 with the core network 102. The RAN 104 may be one of multiple RANs and may include one or more base stations and a radio network controller (RNC) that are associated with the core network 102 and that provide communications between the core network 102 and multiple data devices. Base stations are typically located in various geographic locations to provide data services for mobile devices in different locations.

The core network 102 may be implemented and configured in accordance with the EPS (Evolved Packet System) specification, which is part of the 3GPP (Third Generation Partnership Project) specification for mobile voice and data networks. FIG. 1 shows a general configuration having examples of logical functional blocks that are most relevant to the present disclosure.

The core network 102 has a gateway 112 that provides data communications between different external networks such as the Internet, as well as between the core network 102 and multiple RANs 104. The gateway 112 may be implemented using IP (Internet Protocol) technologies and packet addressing techniques. In certain environments, the gateway 112 may comprise both a serving gateway (SGW) and a packet data network (PDN) gateway (PGW).

The gateway 112 establishes, uses, and/or maintains multiple end-to-end data bearers 114 for communicating with the mobile devices 110. Each data bearer 114 comprises a communications channel or delivery path between the core network 102 and one of the mobile devices 110. More specifically, each data bearer 114 includes one or more service data flows (SDFs) 116. Each SDF 116 comprises multiple Internet Protocol (IP) flows corresponding to a given service type such as Internet, voice, video, etc. IP flows correspond respectively to applications or services that the mobile device 110 is using. More specifically, an IP flow comprises IP packets transferred between a pair of IP addresses using a single IP socket port number.

Each bearer 114 may have different QoS attributes or commitments. More specifically, each bearer 114 may have a QoS class identifier (QCI) which indicates characteristics of the data bearer such as guaranteed bit rate, priority, packet delay budget, allowed packet error loss rate, etc.

One or more data bearers 114 may be established for communicating with each mobile device 110. Each SDF 116 is assigned QoS policies or rules (e.g. priority, bandwidth control, etc.) in accordance with user subscription information and other network policies. In order to implement QoS policies of the SDFs 116, each SDF 116 is mapped to a data bearer 114 that satisfies the QoS policies desired for the SDF 116.

IP flows are mapped to SDFs by SDF templates. SDFs are mapped to data bearers by traffic flow templates (TFTs). SDF templates and TFTs are filters that specify source and destination IP addresses, source and destination socket port numbers, and protocol identifiers. Packets having addresses, port numbers, and protocol identifiers matching a particular template are mapped by that template to a corresponding SDF or data bearer.

The core network 102 may include a traffic management component 118. In an LTE or EPS embodiment, the functionality of the traffic management component 118 may be performed by the MME (Mobility Management Entity) of the system. The MME is the main control element of an LTE access network, and is responsible for bearer activation and deactivation.

The core network 102 may have or operate in accordance with subscription data 120, which defines types of services and other service data for different subscribers and services provided by the network 100. In LTE/EPS embodiments, the subscription data 120 may be referred to as a Home Subscription Service (HSS). The subscription data 120 contains subscriber-related information supporting call control and session management, and may also be used for security, authentication, and authorization of users and devices. The subscription data 120 may also define QoS commitments and requirements for different users and services.

The core network 102 may have a policy controller 122. In the described embodiment, the policy controller 122 may comprise a Policy Charging Rules Function (PCRF) or PCRF module. The policy controller 122 establishes communication parameters for communicating with the mobile devices 110. For example, the policy controller 122 determines QoS levels for each SDF 116 in accordance with user subscription information obtained from the subscription data 120, which indicates QoS characteristics for different users and types of services or data flows. The policy controller 122 may also determine how to charge users for data usage or what types of data usage are allowed.

The radio access network 104 implements communications protocol stacks 124(a) and 124(b) at the mobile device 110 and base station 108, respectively, for providing communications between the mobile device 110 and the base station 108. For a particular bearer or service, a pair or set of corresponding or peered communication protocol stacks 124(a) and 124(b) are instantiated at the base station 108 and the mobile device 110, respectively. Although only a single pair of corresponding protocol stacks 124 are shown, the RAN 104 may instantiate multiple pairs of protocol stacks 124, corresponding respectively to different bearers or services in use by the mobile device 110. Each pair of protocol stacks 124 creates a corresponding radio bearer 126 between the base station protocol stack 124(b) and the mobile device protocol stack 124(a). Each radio bearer corresponds to a respective data bearer 114 between the core network 102 and the RAN 104.

Communication attributes or parameters of the SDFs 116, data bearers 114, and radio bearers 126 may in some cases be established in cooperation with the gateway 112 and the traffic management component 118, under the direction of the policy controller 122 at the core network 102. Attributes, characteristics, and/or parameters of SDFs, data bearers, and radio bearers may include one or more of:

packet treatment characteristics, including scheduling weights,
protocol stack configurations, etc.;
mappings of IP flows to SDF templates;
mapping of SDFs to TFTs;
data bearer properties;
QoS parameters;
relative priorities of data flows, including IP flows and service data flows;
relative priorities of data packets within bearers and data flows;
which of multiple base stations are used for communicating between the core network and a different mobile devices;
assignments of bearers to virtual communication ports or socket port numbers.

Each protocol stack 124 comprises a number of protocol layers, including a physical (PHY) layer 128, a media access control (MAC) layer 130, a radio link control (RLC) layer 132, a packet data convergence protocol (PDCP) layer 134, and a radio resource control (RRC) layer 136. These layers cooperate to transfer data packets that are addressed by Internet Protocol (IP) headers. Various of the layers may perform buffering, error detection, error correction, retransmissions, acknowledgements, etc.

The RRC layer 136 implements a control plane that handles radio-specific functionality. The RRC layer 136 is responsible for connection control and broadcasting of system information as well as configuration of the protocol stack 124 for a radio bearer as directed by the RRM component of the base station 108.

The PDCP layer 134 is responsible for header compression/decompression, control plane encryption/decryption, and cellular handover management.

The RLC layer 132 is responsible for flow control between the mobile device 110 and the base station 108 by providing buffering and error correction using a sliding window protocol. The RLC layer 132 passes data to and receives data from the MAC layer as logical channels.

The MAC layer 130 is responsible for mapping between transport and logical channels, error correction using HARQ, priority handling and dynamic scheduling, and logical channel prioritization. The MAC layer 130 passes data to and receives data from the PHY layer as transport channels.

The PHY layer 128 performs physical, over-the-air transport of data. The PHY layer 128 translates between transport channels and physical channels.

In order to support the QoS policies established by the core network 102 within the RAN 104, the core network 102 may communicate and provide communication parameters to a radio resource management (RRM) component 138 of the base station 108. The RRM component 138 receives the communication parameters and assigns them as appropriate to radio bearers 126.

The RRM 138 may have an admission and bearer elements 138 that communicate with the core network 102 to reserve resources and to request creation of a data bearer 114 prior allowing or opening a connection with a mobile device 110. Upon receiving a connection request from the mobile device 110, the admission control elements 138 allocate or reserve RAN radio resources. The admission control elements 138 also communicate with the core network 102 to reserve resources for creating and modifying the bearers 114.

In operation, the admission and bearer control elements of the RRM component 138 allocate communication resources and other resources for each of the bearers 114. Allocated resources include frequencies, channels, time slots, socket port numbers, and so forth. The initial allocation or reservation of resources is performed so as to satisfy the QoS requirements of the bearers 114. In certain cases, however, the RRM component 138 may deliberately over allocate or over commit the resources of the RAN 104, meaning that more resources are committed or allocated than are actually available. This is permissible because the bearers 114 and SDFs 116 are often underutilized and do not consume the total resources that have been allocated to them. However, full utilization of the bearers 114 and SDFs 116 may at times produce traffic congestion at the RAN 104, which can lead to packet drops and a decline in user experience. Poor radio conditions may further aggravate the problem.

Certain layers of the protocol stacks 124 are designed to accommodate declines in user experience such as this. For example, the RLC protocol layer 132 implements a retransmission request scheme referred to as automatic repeat request (ARQ). The MAC layer 130 similarly implements a retransmission request scheme referred to as hybrid ARQ (HARQ). However, these retransmission techniques further increase the congestion on the radio without any feedback to the core network, thus resulting in inefficient and wasteful use of the transport or backhaul channel bandwidth.

In some cases, data and/or data packets may be lost or discarded by certain protocol layers or the protocol stacks 124. As an example, a lack of available resources can cause buffer overflows or overruns in the RLC protocol layer 132. Similarly, the PDCP layer 134 may discard packets when presented with insufficient resources for transmitting the packets to the mobile device 110.

RLC buffer overflows occur in the RLC protocol layer 132 as a result of receiving more data from the PDCP layer 134 than can be transmitted to or accepted by the MAC layer 130. PDCP packet discards occur in the PDCP layer 134 when there are insufficient resources for transmitting the packets to the mobile device 110. Poor radio conditions may cause more than anticipated use of bandwidth in order to transmit the same data throughput than would be otherwise necessary. RLC ARQ retransmissions occur in the RLC layer 134 in accordance with the ARQ retransmission scheme. HARQ packet retransmissions occur in the MAC layer 130 in accordance with the HARQ retransmission scheme.

In the described embodiment, the RAN 104 has a congestion monitors 140 that communicate with the protocol stacks 124 of the mobile device 110 and the base station 108 to monitor numbers or rates of lost data packets, where such data packets may comprise service data units (SDUs) and/or protocol data units (PDUs). More specifically, the congestion monitors detect and report RAN congestion metrics, which may include numbers or rates of (a) RLC buffer overflows, (b) PDCP packet discards, (c) RLC ARQ retransmissions or retransmission requests, and (d) HARQ packet retransmissions or retransmission requests.

In implementation, the congestion monitors 140 may include a mobile device congestion monitor 140(*a*) implemented by the mobile device 110 and a base station congestion monitor 140(*b*) implemented by the base station 108. The congestions monitors 140(*a*) and 140(*b*) are configured to generated congestion reports or notifications 142(*a*) and 142(*b*), respectively. More specifically, the mobile device congestion monitor 140(*a*) is configured to provide congestion reports or notifications 142(*a*) to base station 108 indicating the congestion observed at the mobile device 110. The base station congestion monitor 140(*b*) is configured to provide congestion reports or notifications 142(*b*) to the core network 102 indicating the congestion observed at the mobile device 110. The reports 142(*a*) may also include the reports 142(*b*) or may include information indicated by the mobile device congestion reports 142(*b*), such as the congestion observed at the mobile device 110.

The congestion monitor 140(*a*), which may be implemented as part of the mobile device 110, may communicate with the protocol stack 124(*a*) to receive lost packet information form the protocol stack 124(*a*) of the mobile device 110. The congestion monitor 140(*b*), which may be implemented as part of the base station 108, may communicate with the protocol stack 124(*b*) to receive lost packet information form the protocol stack 124(*b*) of the base station 108.

The reported congestion metrics or measures are indicative of data congestion occurring at the RAN 104 and may be used by the core network 102 in deciding how to best alter parameters and characteristics of the data bearers 114 and the service data flows 116. The congestion metrics represent data obtained from the protocol stacks 124(*a*) of the mobile device 110 and the protocol stacks 124(*b*) of the base station 108. Generally, the base station protocol stacks 124(*b*) indicate packet losses in the downlink from the base station 108 to the mobile device 110, while the corresponding mobile device protocol stacks 124(*a*) indicate packet losses in the uplink from the mobile device 110 to the base station 108. The metrics indicated by the congestion reports 142 may include numbers or rates of overflows, discards, and retransmissions reported by either the base station protocol stack, the corresponding mobile device protocol stack, or both.

Each report or notification 142 indicates a measure of the number or rate of lost, discarded, and/or retransmitted data packets. For example, such a measure may indicate an absolute number of data packets that are lost, discarded, and/or retransmitted during a given time period. As another example, a percentage may be given, indicating a percentage of packets that are lost, discarded, or retransmitted. Other indicators may also be used, such as severity codes indicating relative degrees of congestion based on number of lost packets.

Congestion metrics may be aggregated and reported in summary form to indicate an overall measure of lost, discarded, or retransmitted packets at a particular base station. Alternatively, congestion metrics may be reported at higher levels of granularity, such as by the rates of congestion for individual data bearers or services. In some cases, congestion metrics may be separately indicated for each of the protocol layers of the protocol stack 124. For example, each report 142 may indicate individual measures of packets dropped by the RLC layer 132, retransmission requests by the RLC and MAC layers 132 and 130, etc.

Within the RAN 104, congestion data or reports 142 may be sent from the mobile device 110 to the base station 108 using in-band signaling within the radio bearers 126 corresponding to user plane traffic, eg. as part of a well-defined MAC packet data unit (PDU), by LTE out-of-band non-access stratum (NAS) signaling, by out-of-band RRC signaling, and/or by other signaling mechanisms. Congestion reports 142 may be sent from the RAN 104 to the core network 102 on an LTE S1 interface, GPRS tunneling protocol (GTP) interface or another interface. The frequency of the reports 142 may be limited to avoid wasting backhaul communication resources. In some cases, the reports 142 may be sent or provided only during periods when congestion is actually occurring, such as when numbers or rates of lost, discarded, or retransmitted data packets exceed corresponding congestion thresholds. Once such a threshold is exceeded, further notifications may be provided at different intervals and/or in response to different thresholds. For example, a first notification may be provided when the congestion reaches a first threshold. Second notifications may subsequently be provided when congestion meets or exceeds a higher threshold, indicating worsening congestion.

Congestion thresholds may be defined by network operators to correspond to desired key performance indicators (KPIs). Different thresholds may be used for different types of services and/or for bearers having different QoS requirements or attributes. Thresholds may also be based on subscription data for individual users. The thresholds may in some cases be learned from observation or experience. In some cases, machine learning may be used to determine appropriate thresholds for different services by observing the highest rates of packet losses that still result in acceptable KPIs.

The policy controller 122 is responsive to the congestion reports 142 to change or adjust the communication parameters of the data bearers 114 and SDFs 116, with a goal of reducing or redistributing data volume. A modification in data bearer 114 or SDF 116 parameters results in a change in the attributes of the corresponding radio bearer 126 at the protocol stack 124 at the RAN 104, consequently reducing packet loss and data congestion at the RAN 104. The policy controller 122 changes the communication parameters with a goal of reducing the number or rate of data packets that are lost at the RAN 104, including packets that are discarded or dropped due to buffer overflows and packets for which retransmissions are requested.

Figures 2, 3:
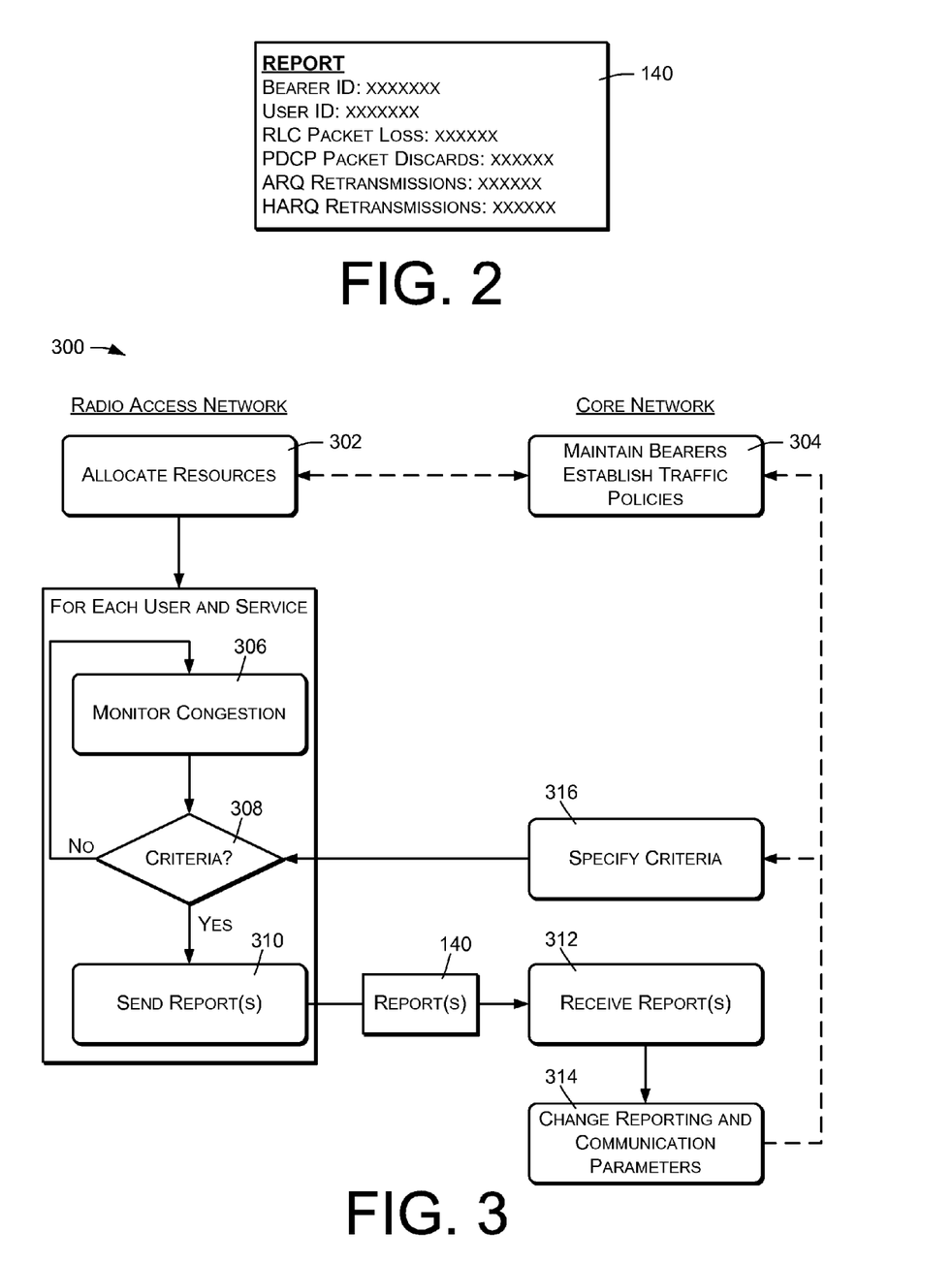
FIG. 2 is a block diagram of an example congestion report.
FIG. 3 is a flow diagram illustrating an example method of modifying communication parameters at a core network of a cellular communications system based on congestion feedback from a radio access network of the cellular communications system.

FIG. 2 shows an example of a congestion report 142, which may be comprised by either a report 142(a) or 142(b), and which may be provided to the core network 102. In this example, the congestion report 142 identifies a data bearer ID and user ID to which the report applies. The congestion report indicates, with respect to the identified data bearer, one or more measures of (a) RLC packet loss, (b) PDCP packet discards, (c) ARQ retransmissions or retransmission requests, and (d) HARQ retransmissions or retransmission requests. As indicated above, the reported metrics may be indicated as absolute numbers, as percentages, as rates, or as coded severity indicators. Multiple reports, corresponding to different data bearers and different users or endpoints, may be provided from the RAN 104 to the core network 102.

Returning to FIG. 1, the policy controller 122 of the core network 102 is responsive to the congestion reports 142 to change one or more of the communications parameters of the data bearers 114 and/or data flows 116, in order to reduce the data congestion at the RAN. Such changes may include one or more of:

changing one or more properties of one or more of the data bearers;
terminating one or more of the data bearers;
changing one or more mappings of data flows to service data flow templates;
changing one or more mappings of service data flows to traffic flow templates;
changing one or more QoS attributes of one or more of the data bearers;
prioritizing data packets within the data bearers;
handing off one or more of the data bearers to a different base station; or
changing one or more assignments of data bearers to socket port numbers.

As an example of changing data bearer attributes, the minimum guaranteed bit rate of a data bearer may be lowered to decrease the amount of data carried by the data bearer. Other bearer QoS parameters, such as Allocation Retention Priority (ARP), may also be changed to reduce traffic volumes. Data bearers may also be released or terminated in some cases after notifying the user.

As another example, a TFT may be changed to assign a bearer to a different socket port number, thereby reducing congestion at the previous port.

As another example, packets of a data flow that is experiencing lost packets may be marked using differential packet marking so that they are given priority within a data bearer.

The changes in traffic policies may be based at least in part on the congestion reports 142, and also in part on other information known at the core network 102 such as guaranteed QoS commitments and user subscription data as indicated by the subscription data 120.

The decision-making functions of the policy controller 122 regarding traffic policies may be performed by the PCRF in certain LTE implementations. Alternatively, the policy controller 122 may be implemented independently or by other components of the core network 102, including the gateway 112 and the traffic management component 118.

Each of the mobile device 110, the base station 108, and the core network 102 may be implemented in part using one or more processors and various types of associated memory.

The memory may contain computer-executable instructions that are executed by the processor to implement the logical functionality attributed herein to each of the mobile device 110, the base station 108, and the core network 102. In FIG. 1, the mobile device 110 is shown as having a processor and associated memory combination 144. The base station 108 is shown as having a processor and associated memory combination 146. The core network 102 is shown as having a processor and associated memory combination 148. The base station 108 or the core network 102 may in some cases be implemented by one or more server computers having processors, memory, and stored instructions for performing the functionality described herein. The described functionality may also be performed at least in part by other physical and logical components that are not specifically shown in FIG. 1.

FIG. 3 illustrates an example method 300 that may be performed by one or more components of the network 100. Actions on the left side of FIG. 3 may be performed by the RAN 104. Actions on the right side of FIG. 3 may be performed by the core network 102.

The actions 302 and 304 are ongoing actions that may be performed repetitively and continuously by the RAN 104 and the core network 102. The action 302 comprises reserving or allocating resources at the RAN 104 for communications with multiple mobile devices 110 to support multiple communication channels or bearers 114 between the core network 102 and the RAN 104. The action 302 may be performed by admission and bearer control elements of the RRM component 138 and may include allocating radio resources, which may include frequencies, channels, time-division multiplexing (TDM) slots, and so forth to the radio bearers 126, to support selected QoS commitments of the data bearers 114 between the core network 102 and the mobile devices 110. The action 302 may also comprise assigning data bearers to communication ports or sockets. As discussed above, the admission control component 138 may in some cases over allocate or over commit its available radio resources, such as by committing more resources than are actually available. This may result in congestion when a large number of bearers operate at their fully allocated capacities.

The action 304, performed at or by the core network 102, comprises establishing and/or maintaining the data bearers 114 and applying or enforcing traffic policies for the data bearers 114 in accordance with the selected subscriptions and QoS commitments and other communication parameters of the data bearers 114 and SDFs 116. Traffic policies may be implemented by communication parameters such as QoS parameters, data flow priorities, TFT mappings, SDF template mappings, selection of base stations for individual data bearers, etc.

An action 306, performed at or by the RAN 104, comprises monitoring congestion at the RAN 104, which may include congestion detected at the mobile device 110 and congestion detected at the base station 108. Congestion may be evidenced by dropped, discarded, retransmitted, or lost data packets, and/or by repeated requests for packet retransmissions, such as may result from operations of the layers of the protocol stacks 124.

An action 308 comprises determining whether notification criteria have been satisfied relating to either the amount of detected congestion or the time since a congestion report has been provided to the core network 102. For example, criteria may be specified in terms of threshold numbers or rates of dropped, discarded, or retransmitted data packets. When one of the monitored metrics exceeds the corresponding threshold a congestion report is generated. Alternatively, or in addition, the criteria may specify a threshold time limit after a previously generated congestion report, only after which an additional report will be sent. If the criteria are not satisfied, the RAN 104 continues to monitor congestion to detect congestion levels.

If the criteria are satisfied in the action 308, an action 310 is performed of generating and transmitting a congestion notification or report 142. The report 142 may indicate a measure of congestion at the RAN 104, such as the number or rate of data packets that have been lost due to packet discards or retransmissions.

The actions 306, 308, and 310 are performed with respect to each service of each user or mobile device. Different thresholds or other criteria may be used for different services. Different thresholds or other criteria may also be used for different users, depending on user subscription data.

An action 312 comprises receiving the congestion report 142 by the core network 102. In response to detected data congestion as indicated by the congestion report 142, an action 314 comprises changing the communication parameters of existing data bearers 114 and SDFs 116 that are maintained by the core network 102. Modifications to communication parameters may include modifying QoS commitments of data bearers where possible, modifying other properties of data bearers, initiating differential packet marking, modifying TFTs, modifying SDF templates, etc., with the goal of reducing the volume of data carried by the data bearers or of shifting data traffic to otherwise underutilized RANs, channels, bearers, or ports. The action 314 may also comprise modifying the reporting criteria used by the RAN 102.

In some cases, the policy controller 122 or other component of the core network 102 may perform an action 316 of communicating with the RAN 104 to specify the criteria used in the action 308. The criteria may be changed dynamically by the policy controller 122 so that reports are generated and received in response to different conditions. For example, the core network 102 may initially specify a first set of congestion thresholds. After receiving a congestion report, the core network 102 may modify the congestion thresholds or instruct the RAN 104 to not send any further congestion reports. Similarly, the core network 102 may specify the maximum frequency at which reports are to be sent and may change the frequency depending on conditions. For example, the core network may in some situations instruct the RAN 104 to slow the frequency of congestion reports under conditions in which the core network is unable to make further changes in communication parameters that would further reduce RAN congestion. In some cases the policy controller may change the data bearers or the parameters thereof to be monitored for congestion reporting.

Figure 4:
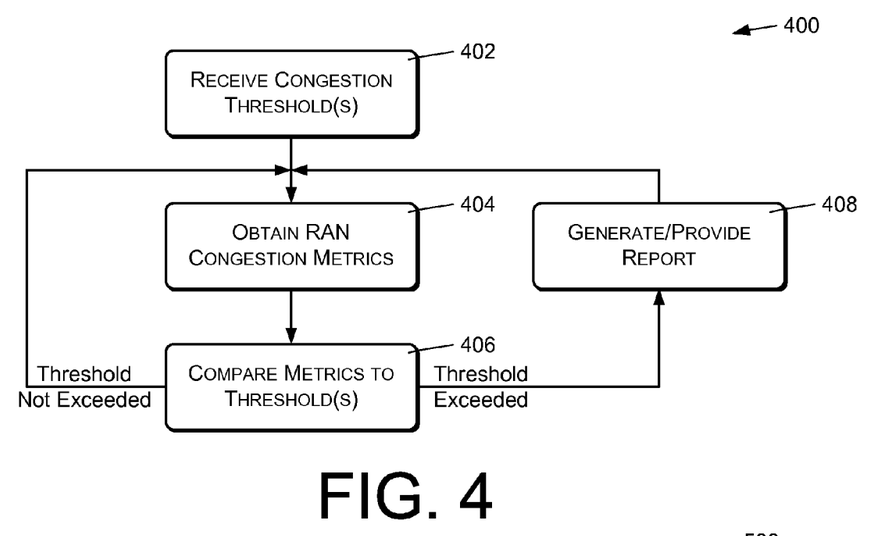
FIG. 4 is a flow diagram illustrating an example method of creating and providing congestion metrics and reports by a radio access network of a cellular communications system.

FIG. 4 illustrates an example method 400 that may be performed by the congestion monitor 140 of the RAN 104. An action 402 may comprise receiving congestion thresholds. The congestion thresholds may be specified by a network operator and may be received from the core network 102. Different thresholds may be provided for different services and for different users, depending on the subscriptions of the different users. Different thresholds may also be provided for different types of packet losses, such as for RLC packet discards, PDCP packet discards, ARQ retransmissions or retransmission requests, and HARQ retransmissions or retransmission requests.

An action 404 comprises obtaining RAN congestion metrics. The RAN congestion metrics may comprise numbers, rates, or other measures of packet losses, including discards and retransmission requests that occur in the protocol stacks 124 of the mobile device 110 and the base station 108. More specifically, the RAN congestion metrics may include numbers, rates, or other measures of (a) RLC packet loss, (b) PDCP packet discards, (c) ARQ retransmissions or retransmission requests, and (d) HARQ retransmissions or retransmission requests. The RAN congestion metrics may relate to the mobile device 110, to the base station 108, or to both the mobile device 110 and the base station 108.

An action 406 comprises comparing the congestion metrics to the provided and corresponding thresholds. If one or more of the congestion metrics exceeds its corresponding congestion threshold, an action 408 is performed of generating and/or providing a congestion report to the core network 102. Otherwise, if none of the congestion thresholds have been exceeded, the actions 404 and 406 are repeated.

Figure 5:
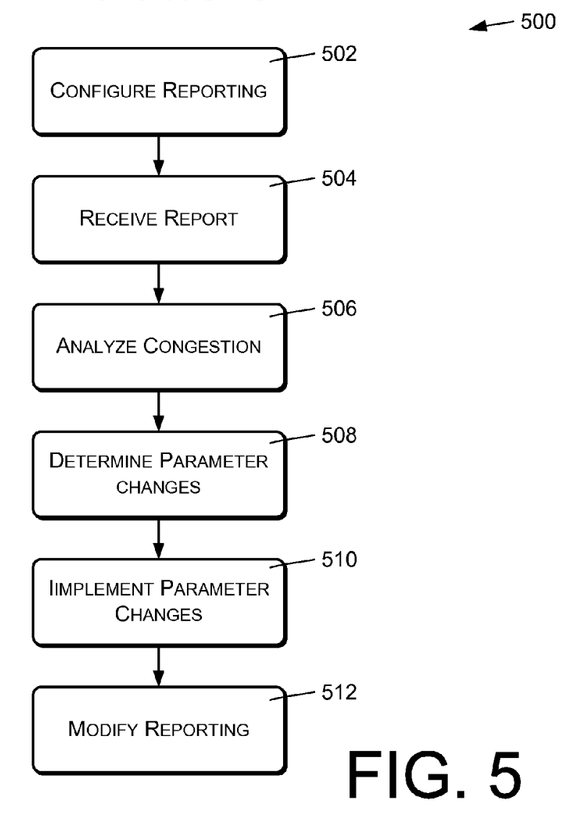
FIG. 5 is a flow diagram illustrating an example method of changing communication parameters at a core network of a cellular communications system in response to congestion metrics received from a radio access network of the cellular communications system.

FIG. 5 illustrates an example method 500 that may be performed by the policy controller of the core network 102. An action 502 comprises establishing reporting policies to be used by the congestion monitors 130 of the RAN 104, which may include communicating with the RAN to provide the reporting policies. Reporting policies may indicate congestion thresholds, reporting criteria, maximum reporting frequencies, and so forth, as well as indicating which data bearers should be monitored and reported upon.

An action 504 comprises receiving a congestion report that indicates congestion metrics regarding one or more services, service flows, and/or data bearers. As discussed above, the congestion metrics may comprise rates, numbers, or other measures of packet losses, such as indicated by buffer overflows, packet discards, and packet retransmission requests that occur within the protocol stacks of the mobile device 110 and the base station 108.

An action 506 comprises analyzing the type and location of congestion. For example, the action 506 may comprise determining the particular bearer or service type or a user that is experiencing the congestion, based on the metrics contained in the received congestion report. The action 506 may also comprise determining the severity of the congestion in relation to desired key performance indicators, user subscription data, and/or existing QoS policies.

An action 508 comprises determining changes in communication parameters that will reduce packet losses at the RAN. Changes may include moving or handing over data bearers to different base stations based on the relative utilization of available or suitable base stations. Other changes may include changing TFTs, changing SDF templates, assigning bearers to different communication ports, implementing packet prioritization, and so forth.

An action 510 comprises implementing the determined changes in communication parameters.

An action 512 comprises evaluating current reporting policies implemented by the RAN 104 and potentially modifying the reporting policies. This may include communicating with the RAN 102 to provide modified reporting policies such as reporting criteria, formats, thresholds, frequencies, etc. for individual data bearers or SDFs, as well as specifying which data bearers or SDF are to be monitored.

Figure 6:
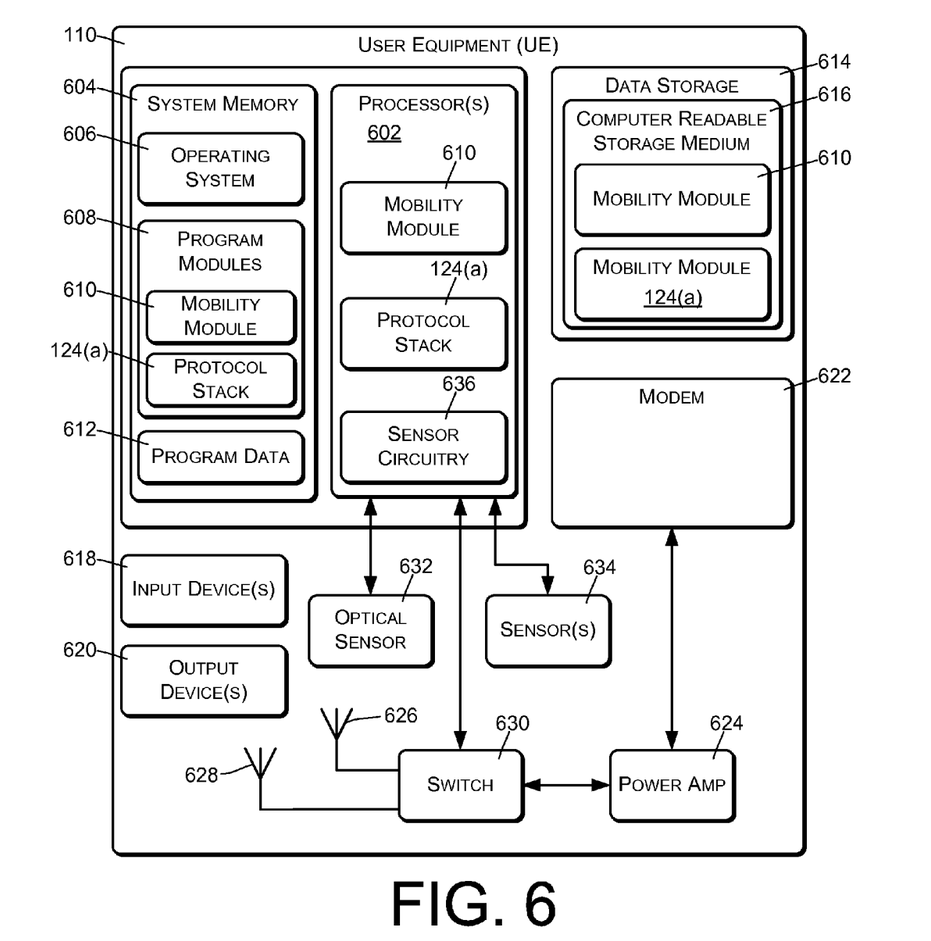
FIG. 6 is a block diagram illustrating an example configuration of a mobile data device such as may be used in a cellular communications system.

FIG. 6 illustrates an example configuration of a mobile device or UE 110. The UE 110 may be any type of computing device such as an electronic book reader, a PDA, a mobile phone, a laptop computer, a portable media player, a tablet computer, a smart phone, a camera, a video camera, a netbook, a desktop computer, a gaming console, a DVD player, a computing pad, a media center, and the like. The UE 110 may also be referred to as a mobile computing device.

The UE 110 includes one or more processors 602, such as one or more CPUs, microcontrollers, field programmable gate arrays, or other types of processors. The UE 110 also includes system memory 604, which may correspond to any combination of volatile and/or non-volatile storage mechanisms. The system memory 604 may include one or more of read-only memory (ROM), flash memory, dynamic random access memory (DRAM) such as synchronous DRAM (SDRAM)), and static random access memory (SRAM)). The system memory 604 stores information that provides an operating system component 606, various program modules 608 such as mobility module 610, program data 612, and/or other components. The UE 110 performs functions by using the processor(s) 602 to execute instructions stored by the system memory 604. The processor 602 and the system memory 604 may also store and execute instructions that implement the protocol stack 124(*a*) of the UE 110.

The UE 110 also includes a data storage device 614 that may be composed of one or more types of removable storage and/or one or more types of non-removable storage. The data storage device 614 includes a computer-readable storage medium 616 on which is stored one or more sets of instructions embodying any one or more of the methodologies or functions described herein. As shown, instructions for the mobility module 610 and the protocol stack 124(*a*) may reside, completely or at least partially, within the computer readable storage medium 616, system memory 604 and/or within the processor(s) 602 during execution thereof by the UE 110, the system memory 604 and the processor(s) 602 also constituting computer-readable media.

The UE 110 may also include one or more input devices 618 (keyboard, mouse device, specialized selection keys, etc.) and one or more output devices 620 (displays, printers, audio output mechanisms, etc.). In one embodiment, the input devices 618 and the output devices 620 may be combined into a single device (e.g., a touch screen).

The UE 110 further includes a wireless modem 622 to allow the UE 110 to communicate via a wireless network (e.g., such as a cellular communication system) with other computing devices, such as remote computers, a media item providing system, and so forth. The wireless modem 622 allows the UE 110 to handle both voice and non-voice communications (such as communications for text messages, multimedia messages, media downloads, web browsing, etc.) with the wireless communication system. The wireless modem 622 may also allow the UE 110 to handle other signaling data to facilitate communication of the voice and non-voice data between the UE 110 and the wireless communication system. The wireless modem 622 may provide network connectivity using any type of mobile network technology including, for example, cellular digital packet data (CDPD), global system for mobile evolution (GSM), general packet radio service (GPRS), enhanced data rates for GSM evolution (EDGE), universal mobile telecommunications system (UMTS), 1 times radio transmission technology (1×RTT), evaluation data optimized (EVDO), high-speed down-link packet access (HSDPA), WiFi®, HSPA+, WiMAX, Long Term Evolution (LTE) and LTE Advanced (sometimes generally referred to as 4G), etc. It should be noted that the modem 622 may include a processing component that performs various operations to handle both voice and non-voice communications.

The wireless modem 622 may generate signals and send these signals to power amplifier (amp) 624 for amplification, after which they are wirelessly transmitted via antenna 626 or antenna 628. A switch 630 is coupled between the power amp 624 and the two antennas 626 and 628. In one embodiment, the switch 630 is controlled by the processor(s) 602. In another embodiment, the switch 630 is controlled by the wireless modem 622. The antennas 626 and 628 may be directional, omni-directional or non-directional antennas. In addition to sending data, the antennas 626 and 628 can be deployed to receive data, which is sent to the wireless modem 822 and transferred to the processor(s) 602. In one embodiment, the antennas 626 and 628 may be used to form communication links between the UE 110 and the base station 108.

The processor(s) 602 and the modem 622 may be implemented by general-purpose processing devices such as a microprocessors, central processing units, or the like. More particularly, each of the processor(s) 602 and the modem 622 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Each of the processor(s) 602 and the modem 622 may also be one or more special-purpose processing devices such as an application specific integrated circuit (ASIC), a field programmable gate array (FPGA), a digital signal processor (DSP), network processor, or the like.

In one embodiment, UE 110 includes an optical sensor 632 such as a camera. The optical sensor 632 may be positioned such that images are taken of a user's face while the user holds the UE 110 in front of his face in a standard reading position. Alternatively, the optical sensor 632 may be positioned such that images are taken of a scene that the user is facing.

In one embodiment, UE 110 includes one or more sensors 634 such as a physical contact sensor or close proximity sensors. The sensors 634 can detect the human body parts proximate to the user device, and convey information regarding the detection to the processor(s) 602. In one embodiment, the sensors 634 may be capacitive sensors that are configured to measure capacitance generated by the human body part proximate to the user device using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 634 may also be optical (e.g., infrared) sensors that use an emitter and receiver pair to detect the presence of opaque objects. Alternatively, the sensors 634 may be inductive sensors, which include an inductive loop. When the presence of a human body part (or metal object) is brought close to the inductive sensor, an induction of the inductive loop changes, causing the human body part to be detected. Alternatively, the sensors 634 may be ultrasonic sensors that emit an ultrasonic signal and measure a time duration between when a signal is transmitted and the reflection of that signal received (a.k.a., flight response). The sensors 634 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. It should also be noted that the sensors 634 may be used to determine a distance between one or more of the antennas and the detected human body part. Though the detected object is described herein as a human body part, other types of objects may also be detected depending on the sensing technologies used.

In one embodiment, one or more of the sensors 634 may be inertial sensors. Inertial sensors can be used to detect motion of the UE 110. In one embodiment, the sensors 634 detect linear accelerations (translational movement) and angular accelerations (rotational movement). The sensors 634 may include compasses, accelerometers and/or gyroscopes. Gyroscopes use principals of angular momentum to detect changes in orientation (e.g., changes in pitch, roll and twist). Accelerometers measure accelerations along one or more axes (e.g., translational changes). The gyroscope and accelerometer may be separate sensors, or may be combined into a single sensor. The sensors 634 in one embodiment are micro-electromechanical systems (MEMS) sensors.

The processor(s) 602 may include sensor circuitry 636 (e.g., sensor device drivers) that enables the processor(s) 602 to interpret signals received from the sensor(s) 634. In one embodiment, the sensors 634 output fully processed signals to the processor(s) 602. For example, the sensors 634 may output a distance, a detected/not detected signal, etc. using a single line interface or a multi-line interface. Similarly, inertial sensors may output an acceleration value (e.g., in Gs). In another embodiment, the sensors 634 output, for example, positional data and/or object presence data (e.g., of a human body part) to the processors 602 without first processing the data. Similarly, sensors 634 may output, for example, voltage values that can be interpreted as acceleration values. In either instance, the processors 602 may use the sensor circuitry 636 to process and/or interpret the received data. If data is received from multiple sensors, processing the data may include averaging the data, identifying a maximum from the data, or otherwise combining the data from the multiple sensors. In one embodiment, in which the sensors 634 include a sensor array, numerous sensors, or a touch panel, processing the data includes determining where on the user device the human body part is located from multiple sensor readings.

In one embodiment, the processor 602 controls whether the switch 630 provides an electrical connection between the power amp 624 and the antenna 626 or 628. For example, if the processor 602 determines that one or more communication links should be reconfigured or modified, the switch 630 may terminate the electrical connection between the power amp 624 and the antenna 626 or 628 (e.g., may terminate a communication link). Alternatively, or in addition, the modem 622 may control the switch.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:
1. A system, comprising:
a long term evolution (LTE) radio access network (RAN), the LTE RAN having an evolved Node B base station, the evolved Node B base station being configured to allocate communication resources for communicating with a mobile data device;
an LTE core network, the LTE core network having a gateway configured to communicate data flows between the LTE core network and the mobile data device;

the LTE core network having a policy and charging rules function (PCRF) module that establishes communication parameters for communicating with the mobile data device;

the evolved Node B base station having a protocol stack and a congestion monitor, the protocol stack configured to detect one or more of data buffer overflows, data discards, or data retransmissions from the evolved Node B base station to the mobile data device indicating that the communication resources of the LTE RAN are insufficient to communicate the data flows between the core network and the mobile data device; and the congestion monitor configured to send a congestion report to the LTE core network, wherein the congestion report indicates a measure of the detected data buffer overflows, data discards, or data retransmissions from the evolved Node B base station to the mobile data device; and wherein the PCRF module, in response to the congestion report, is configured to change one or more of the communication parameters to reduce one or more of the data buffer overflows, data discards, or data retransmissions from the evolved Node B base station to the mobile data device and to provide a reporting policy instructing the LTE RAN to decrease a number of congestion reports the LTE RAN is to send to the PCRF module and to increase a duration of time between the congestion reports to reduce a use of a backhaul communication channel.

2. The system of claim 1, wherein the communication parameters comprise one or more of:
mappings of data flows to service data flow templates;
mappings of service data flows to traffic flow templates;
bearer attributes;
quality of service (QoS) parameters;
relative priorities of packets within data bearers;
which of multiple base stations are used for communicating with different mobile data devices; or
assignments of data bearers to virtual communication ports.

3. The system of claim 1, wherein the PCRF module changes the one or more of the communication parameters by performing one or more of:
changing one or more properties of one or more data bearers that carry the data flows;
terminating one or more of the data bearers;
changing one or more mappings of the data flows to service data flow templates;
changing one or more mappings of service data flows to traffic flow templates;
changing one or more QoS attributes of one or more of the data bearers;
prioritizing data packets within the data bearers;
changing which of multiple evolved Node B base stations is used for communicating with each of one or more of the mobile devices; or
changing which socket port is used for each of one or more data bearers.

4. The system of claim 1, wherein sending the congestion report is performed in response to the measure of the detected data buffer overflows, data discards, or data retransmissions from the evolved Node B base station to the mobile data device exceeding a threshold.

5. A system, comprising:
one or more processors;
one or more computer-readable media storing computer-executable instructions that, when executed on the one or more processors, cause the one or more processors to perform acts comprising:
establishing end-to-end data bearers with a mobile data device through a base station of a radio access network (RAN), wherein each data bearer comprises one or more service data flows;
establishing attributes of the data bearers and service data flows to support corresponding quality of service (QoS) attributes;
receiving a notification from the RAN indicative of data congestion at the RAN;
based on the notification, changing one or more of the attributes of at least one of the data bearers or service data flows to reduce the data congestion at the RAN; and
providing one or more reporting policies to the RAN, at least one of the one or more reporting policies instructing the RAN to decrease a number of the notifications the RAN is to send and to increase a duration of time between the notifications to reduce a use of a backhaul communication channel.

6. The system of claim 5, the actions further comprising changing the reporting policies in response to receiving the notification.

7. The system of claim 5, wherein changing one or more of the attributes further comprises:
receiving, by the system, a notification from each of multiple RANs; and
determining, by the system, a value for each of the one or more of the attributes based at least in part on the notification received from each of the multiple RANs.

8. The system of claim 5, wherein the attributes of the data bearers and service data flows comprise one or more of:
mappings of Internet Protocol (IP) flows to service data flow templates;
mappings of the service data flows to traffic flow templates;
attributes of the data bearers;
quality of service (QoS) parameters;
relative priorities of packets within the data bearers;
which of multiple base stations are used for communicating with different mobile data devices; or
assignments of data bearers to traffic flow templates.

9. The system of claim 5, wherein changing one or more of the attributes comprises one or more of:
changing one or more properties of one or more of the data bearers;
terminating one or more of the data bearers;
changing one or more mappings of Internet Protocol (IP) flows to service data flow templates;
changing one or more mappings of the service data flows to traffic flow templates;
changing one or more QoS attributes of one or more of the data bearers;
prioritizing data packets within the data bearers;
changing which of multiple evolved Node B base stations is used for communicating with each of one or more of the mobile devices; or
changing one or more traffic flow templates properties of data bearers.

10. The system of claim 5, wherein the notification is indicative of data congestion detected by the mobile data device.

11. The system of claim 5, wherein the notification indicates one or more measures of data packets that are (a)

lost at one or more of the mobile data device and the base station, (b) discarded at one or more of the mobile data device and the base station, or (c) requested to be retransmitted by one or more of the mobile data device and the base station.

12. The system of claim 5, further comprising a policy and charging rules function (PCRF) module that performs the changing of the one or more of the attributes.

13. The system of claim 5, further comprising the RAN, wherein the RAN is configured to monitor a measure of lost data packets at one or more entities within one or more protocol stacks of the RAN, wherein the lost data packets include one or more of service data units (SDUs) or protocol data units (PDUs).

14. A method comprising:
communicating data flows between a core network and a mobile data device through a base station of a radio access network (RAN);
establishing communication parameters of the data flows to support quality of service (QoS) commitments;
sending, by the RAN, a notification to the core network, wherein the notification indicates data congestion between the mobile data device and the base station of the RAN and the data congestion is detected at the base station, the notification comprising a measure of one or more of (a) discarded data, (b) data buffer overflows, or (c) requests for data retransmissions from the base station to the mobile data device;
in response to the notification, changing one or more of the communication parameters to reduce the data congestion; and
providing a reporting policy to the RAN to decrease a number of notifications the RAN is to send and to increase a duration of time, between the notifications to reduce a use of a backhaul communication channel.

15. The method of claim 14, wherein:
the base station receives congestion information from the mobile data device by one or more of the following:
in-band signaling within radio bearers;
out-of-band non-access stratum signaling; or
out-of-band radio resource control (RRC);
the base station provides the notification to the core network by one or more of the following:
a long-term evolution (LTE) S1 interface; or
a general packet radio service (GPRS) tunneling protocol interface.

16. The method of claim 14, wherein the core network receives the notification from each of multiple RANs and determines how to change the one or more of the communication parameters based on the notification received from each of the multiple RANs.

17. The method of claim 14, wherein the communication parameters comprise one or more of:
mappings of Internet Protocol (IP) flows to service data flow templates;
mappings of service data flows to traffic flow templates;
attributes of data bearers;
quality of service (QoS) parameters;
relative priorities of packets within the data bearers;
which of multiple base stations are used for communicating with different mobile data devices; or
mapping of traffic flow templates to data bearers.

18. The method of claim 14, wherein the core network is a Long Term Evolution (LTE) core network, wherein changing the one or more of the communication parameters is performed by a policy and charging function (PCRF) module of the LTE core network, and wherein changing the one or more of the communication parameters comprises one or more of:
changing one or more properties of one or more data bearers;
terminating one or more of the data bearers;
changing one or more mappings of Internet Protocol (IP) flows to service data flow templates;
changing one or more mappings of service data flows to traffic flow templates;
changing one or more QoS attributes of one or more of the data bearers;
prioritizing data packets within the data bearers;
changing which of multiple evolved Node B base stations is used for communicating with each of one or more of the mobile devices; or
changing one or more assignments of traffic flow templates to data bearers.

19. The method of claim 14, wherein the data congestion is detected at the mobile data device and the base station.

20. The method of claim 14, further comprising receiving a congestion threshold by the RAN, wherein the notification is provided by the RAN in response to the indicated measure exceeding the congestion threshold.

* * * * *